Patented Aug. 23, 1932

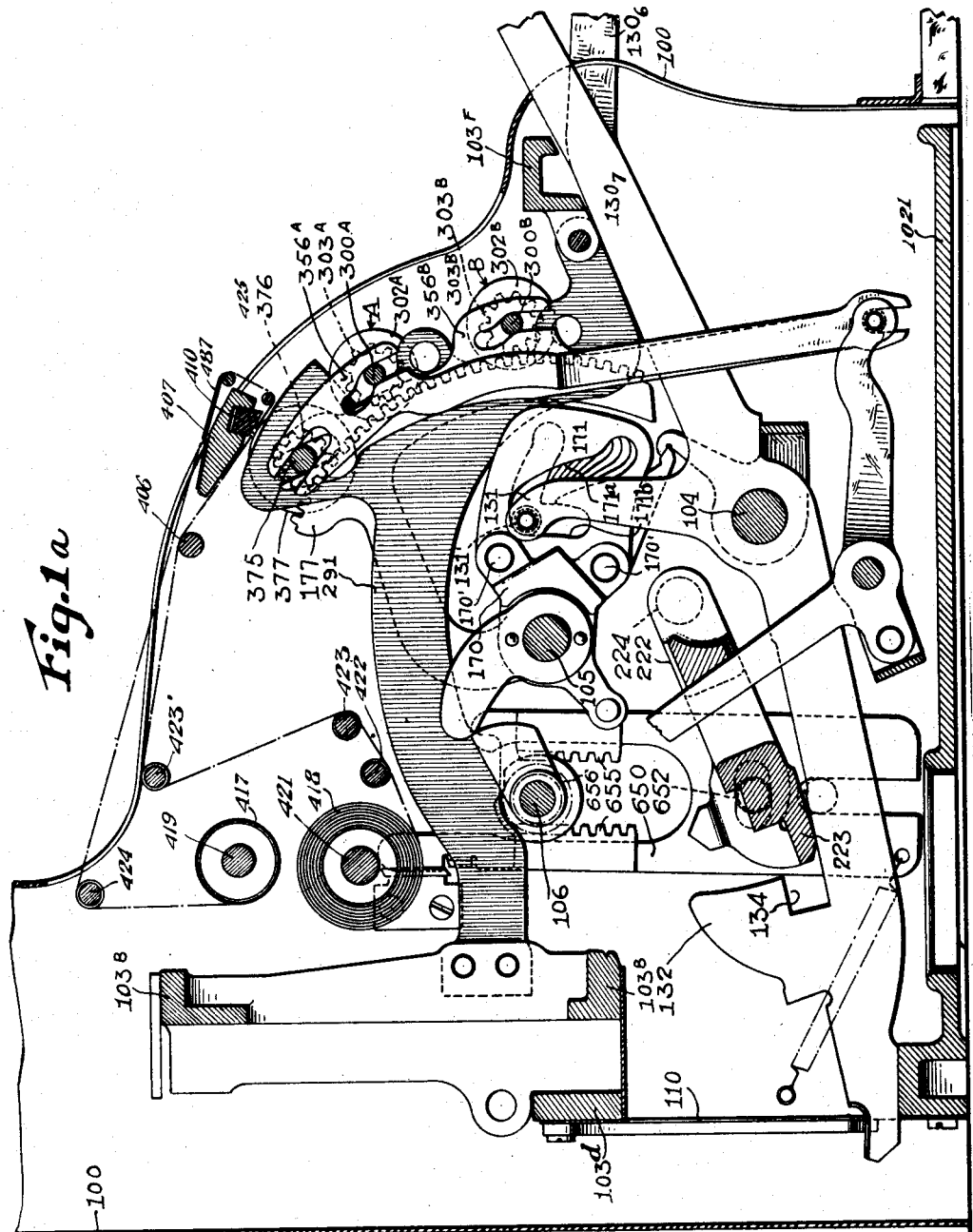

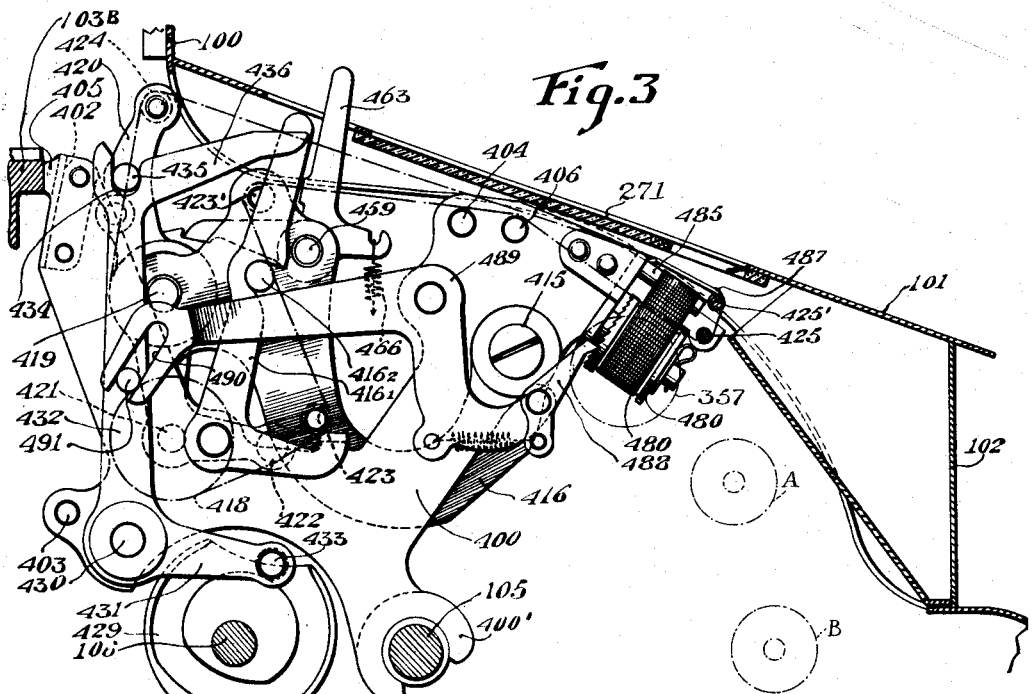
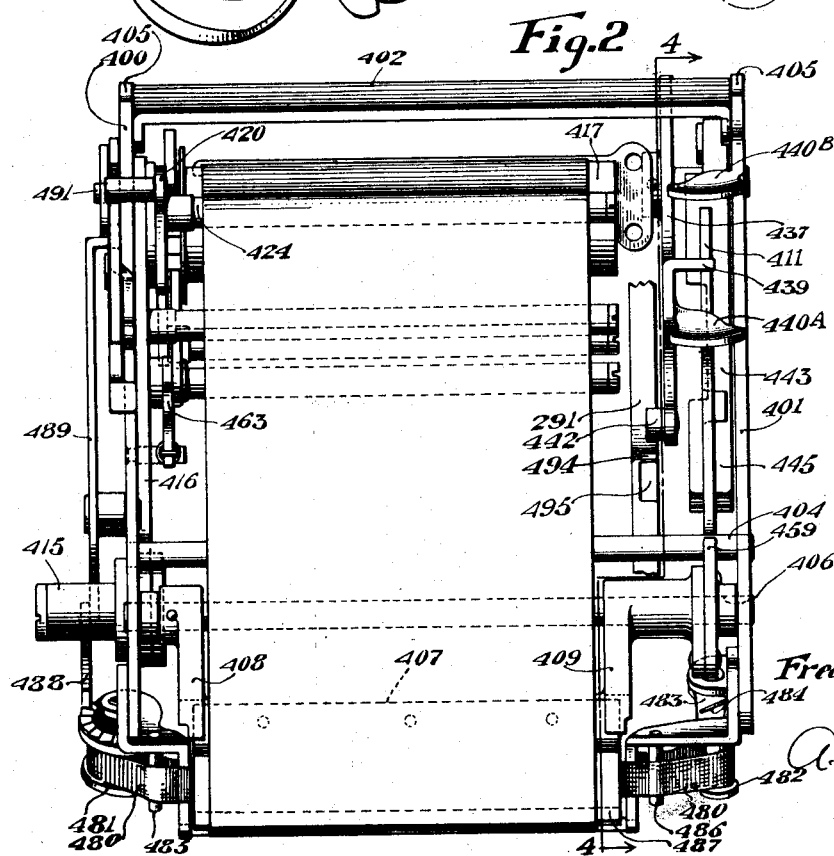

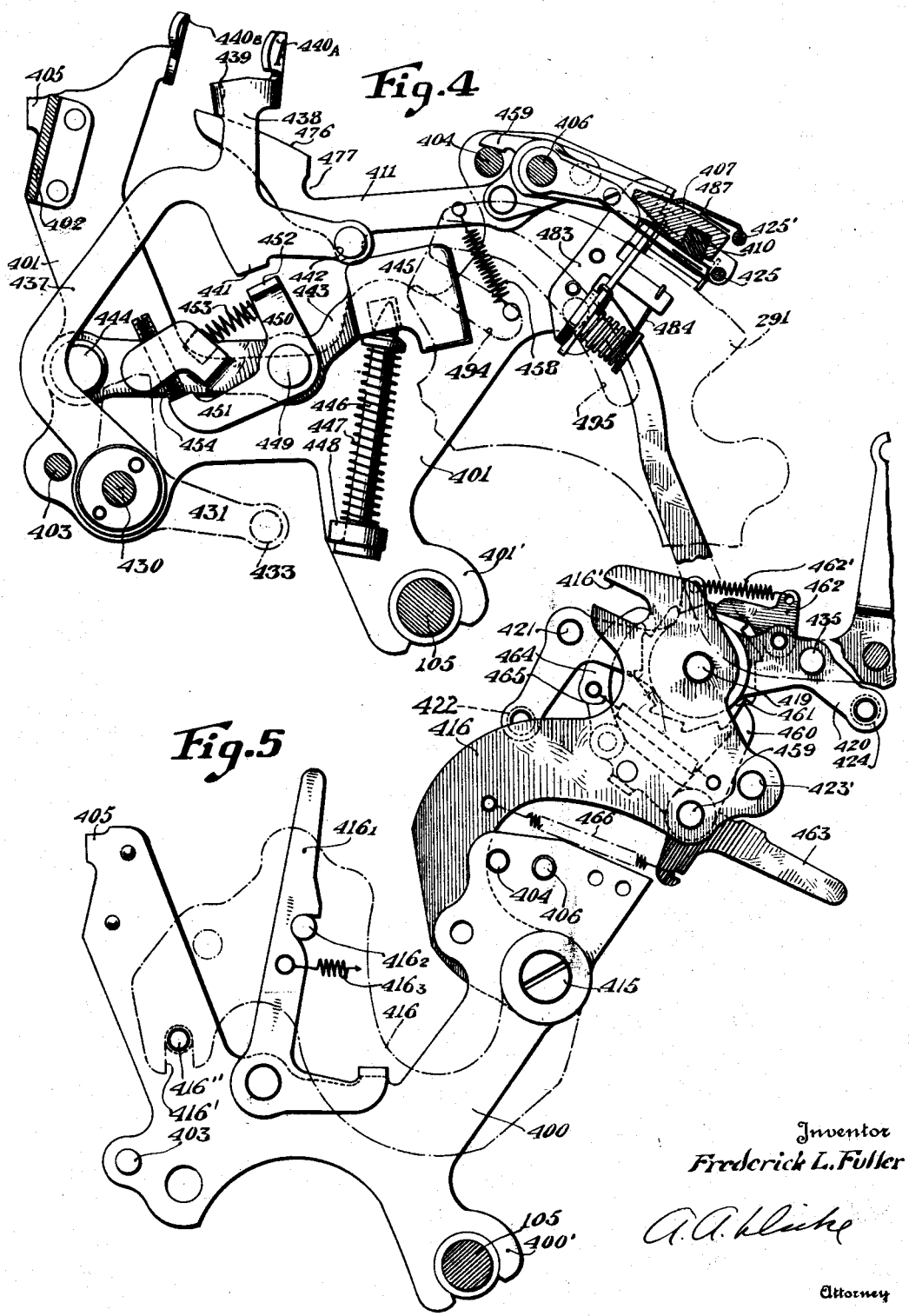

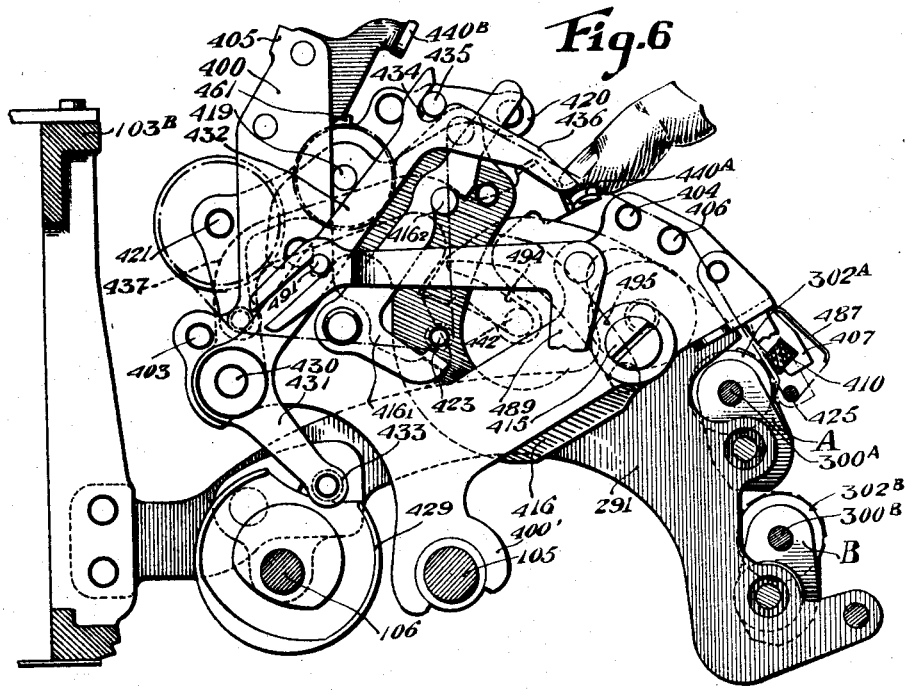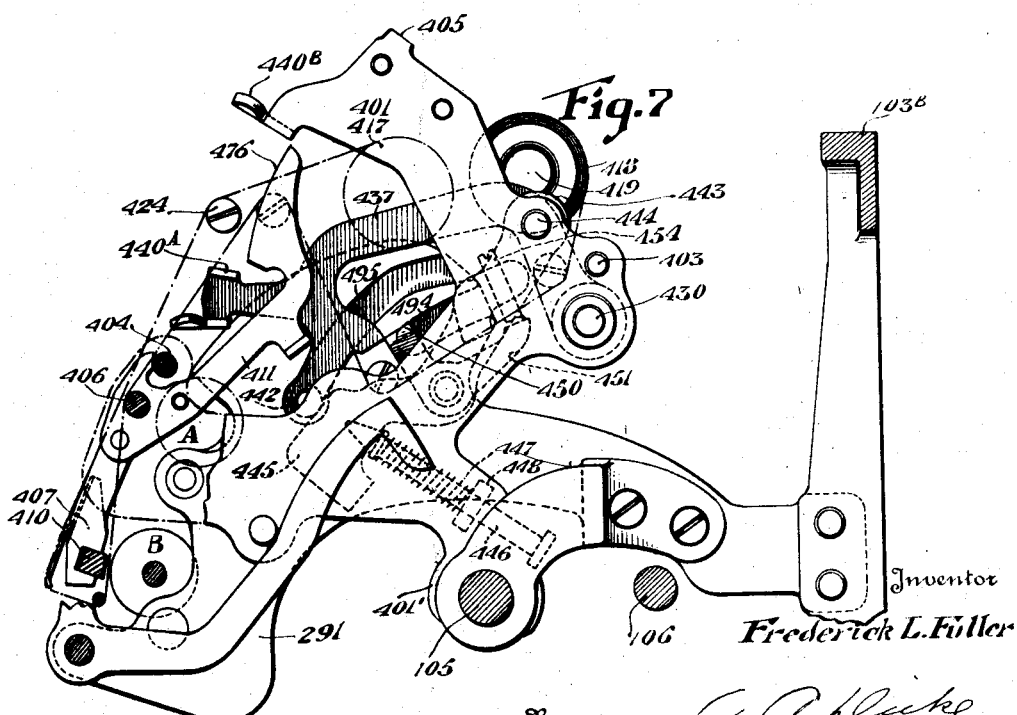

1,873,754

UNITED STATES PATENT OFFICE

FREDERICK L. FULLER, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Original application filed November 19, 1918, Serial No. 263,125. Divided and this application filed December 3, 1926, Serial No. 152,385, and in Great Britain September 12, 1919.

This invention relates to printing mechanism, and the embodiment thereof, selected for purpose of illustration, is pacticularly adapted for use in a cash register, although it is susceptible of ready adaptation to use in other printing devices. This application is a division of application Serial No. 263,125, filed Nov. 19, 1918, which became Patent 1,742,701 on January 7, 1930, to which patent reference may be made for a complete disclosure of the cash registering mechanism.

A cash register of the type described in the parent application, above identified, comprises sets of keys representing numbers and other data, and registering and indicating devices under the control of said keys. A single registering device or totalizer may be provided for accumulating a total of all the items entered in the machine, or a plurality of totalizers may be provided for segregating the items entered in the register according to any desired classification. Such machines may also be provided with mechanism for printing records of the various transactions entered therein, and, likewise, printing the segregated totals accumulated by the plurality of registering devices.

It is the purpose of the present invention to improve the construction of the printing mechanism generally, and to this end the invention comprises improvements in such parts of the printer as impression taking, impression point shifting, ribbon feeding, and record strip feeding and shifting. One construction by which the desired results are obtained is illustrated in the accompanying drawings in which—

Fig. 1a is a transverse sectional elevation of a cash register of the type described in the parent application, above identified, many parts being omitted.

Fig. 2 is a plan view of the improved printing mechanism.

Fig. 3 is a fragmentary sectional elevation showing the printing mechanism and associated parts.

Fig. 4 is a vertical section taken on the line 4—4 of Fig. 2.

Fig. 5 is a side elevation of the printer, showing the frame rocked forward.

Fig. 6 is a side view of the printer mechanism looking from left to right, the printer mechanism having been tilted forward to take an impression from the upper totalizer.

Fig. 7 is a side view of the printer mechanism looking from right to left, the printer mechanism having been tilted forwardly to take an impression from the lower totalizer.

Framework

Figure 1:
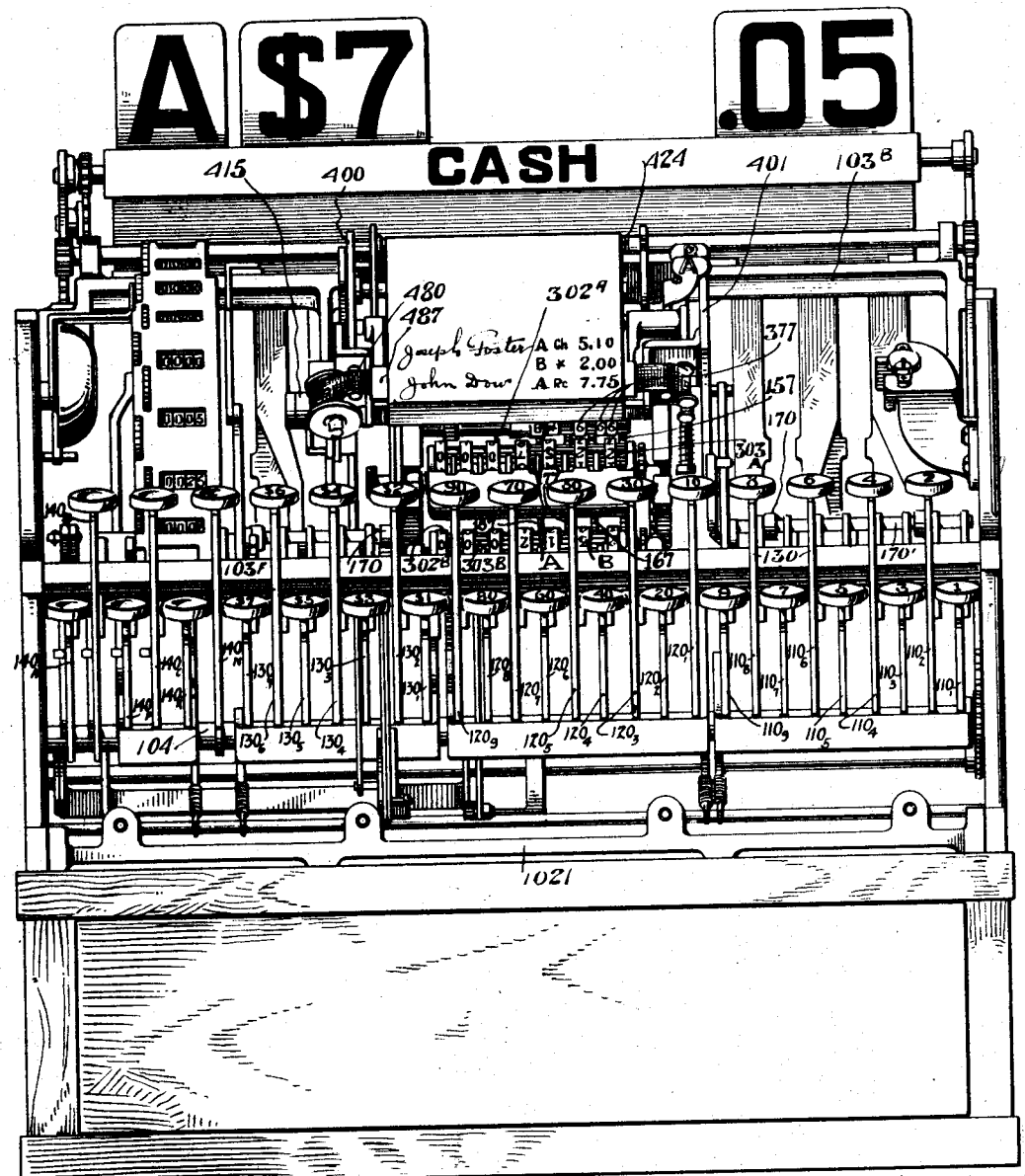
Fig. 1 is a front elevation of a machine embodying my invention, having its hood removed to show the printing mechanism and some of the other inner mechanisms, and also shows the general key arrangement, and the position of the printer with respect to the keys.

The various parts of the mechanism are supported by a suitable frame work comprising a base casting 1021 and suitable side frames. The main side frames are connected at their upper rear ends by a frame work and cross connections in the form of tie bars 103B, 103$d$ and 103F. The mechanism is enclosed by a cabinet 100 preferably formed of one piece and of any suitable material. The cabinet 100 has hinged thereto a flat lid 101 and a front cover 102 which are provided to obtain access to the printing mechanism for replenishing the paper supply, printing totals, and resetting the totalizer, etc.

Keys and operating mechanism

The illustrative machine is provided with a number of groups of keys as shown in Fig. 1 in which the reference characters $110_1$ to $110_9$ indicate the first group or the penny group of keys, the numerals $120_1$ to $120_9$ indicating the dimes group, and the numerals $130_1$ to $130_7$ indicating the dollars group. Four special transaction keys are also provided and are designated by the numerals $140_N$, $140_R$, $140_C$, and $140_P$, respectively, but since the functions of these keys form no part of the invention claimed in this application they will not be described in detail herein.

Keys $140_A$ and $140_B$ shown at the left of Fig. 1 are special clerks' keys and are employed for selecting totalizers, unlocking the amount keys, as well as for performing other functions which do not form a part of the invention claimed in this application and will not be described in detail. For a complete disclosure of the functions and operation of these keys, as well as for the special transaction keys, reference may be had to application Serial No. 263,125, filed November 19, 1918, previously referred to.

The amount keys are pivoted upon a shaft 104 extending transversely of the machine and journalled between the side frames. The keys are guided in their reciprocating movements by slots formed in the front part of the cabinet 100 and are further guided at their rearward ends by a vertically slotted plate 110 attached to the tie bar 103d. Resting upon the rear ends of the keys is a key coupler 222 journalled at 224 between the side frames. The key coupler has a nose 223 co-operating at times with notches 134 formed in the rear ends 132 of the keys. When the outer ends of the keys are depressed the key coupler 222 is rocked clockwise and the nose 223 thereon enters the notches 134. The purpose of such key coupler mechanism is well known in the art and need not be discussed herein.

Connected to the key coupler at 652 is a vertically reciprocating rack plate 650 provided with oppositely facing rack teeth 655 which alternately mesh with a gear 656 fast to a main operating shaft 106 journalled between the machine side frames. The arrangement of this mechanism is such that a reciprocation of the key coupler by the keys will effect a complete rotation of the gear and the shaft 106. Said shaft is provided with cams or other suitable devices for operating the various parts of the register and printing mechanisms.

Differential mechanism

The differential mechanisms or devices controlled by the various groups of keys for adjusting the item type carriers and actuating the totalizer elements are all similar in construction and principle and a description of one will suffice for all. As shown in Fig. 1a, each of the amount keys 130 is provided with an upwardly extending arm 131 carrying a suitable anti-friction roller 131'. Loosely mounted upon the transverse shaft 105 is a frame 170 provided with spaced slots in which are secured by pins 170' a series of cam plates 171, one cooperating with the roller 131' of each key. The cam plates are provided with L shaped slots 171a and 171b, the parts 171b of the slots being concentric with respect to the shaft 105. The parts 171a of the slots are, however, graduated so that when the roller 131' carried by the arm 131 of a depressed key operates in a slot 171a of its associated cam plate 171 it will move the frame 170 differentially and to an amount commensurate with the value of the key depressed. When, however, a frame 170 is thus operated by the depression of any key of the associated group, the rollers of the undepressed keys of the same group will play in the arcuate slots 171b of their respective cam plates, thereby permitting the frame to be raised differentially without interfering with the rollers of the unoperated keys.

It is to be understood that there is a differential frame for each group of amount keys and, as is shown in the drawings, each differential frame has attached thereto a segmental rack. As shown in Fig. 1 the segmental racks 157, 167, and 177, are provided for the penny, dimes and dollar groups, respectively; the segmental rack 187 being provided for the special transaction keys. In continuous mesh with the teeth of the segmental rack 177 is a pinion 376 attached to an item type wheel 377 mounted upon a shaft 375 journalled between the intermediate parallel supporting frames, one of which is shown in Fig. 1a, and designated 291. From the above it will be evident since there may be nine keys and a corresponding number of cam plates 171 in each group, each type carrier or wheel 377 may be brought to any one of nine different positions by the selective depression of the keys associated therewith.

Totalizers and engaging mechanism

Situated below the item type wheels 377 are totalizers, which, for convenience will be designated as "A" and "B". Each totalizer is carried in a rocking frame which is pivoted on a rod extending between the side frames. Each totalizer comprises a series of type wheels, 302A and 302B, mounted for rotation on arbors 300A and 300B, and pinions 303A and 303B associated, respectively, with the type wheels and adapted to be driven by the segmental actuator racks. Both sets of totalizer pinions are normally out of engagement with the actuator racks. To move the desired totalizer into engagement with the actuators the arbor 300A is embraced by a cam slot in a link 356A, and the arbor 300B is embraced by a cam slot in a link 356B, the throw of each cam slot being such that downward movement of each link moves the associated totalizer pinions into engagement with the actuators. The movement of the links is controlled jointly by totalizer selecting keys and levers actuated by cams on the rotation shaft 106, all as fully set forth in the parent application above identified.

Printer

The printing mechanism is so constructed that, in the normal operation of the machine by the keys, an impression is taken from the item type wheels 377, and an impression may be taken at will from the wheels of either totalizer. The printer parts are carried by a frame which is pivotally mounted on the segment shaft 105 and can be swung about this shaft as a center to bring the printing platen into position over the item type wheels, the "A" totalizer or the "B" totalizer.

The printer comprises side plates 400 and 401 (Figs. 2 to 7), provided with claws 400' and 401', engaging with the segment shaft 105. The printing mechanism is positioned midway of the sides of the machine and adjacent the dimes group of keys, as clearly shown in Fig. 1 of the drawings. The side plates are connected by a back bar 402 and tie rods 403 and 404.

The side frames are provided with noses 405 which engage in suitable notches in the back frame of the machine 103B. Extending transversely between the side plates is a platen shaft 406 upon which is supported the platen 407 by means of the arms 408 and 409. The under face of the platen is provided with a rubber cushion 410. Extending rearwardly beyond the platen shaft is the platen tail 411 which is actuated by a hammer for forcing the platen against the type in a manner to be described later. The paper rolls and paper feed mechanism are carried in a separate frame which is pivoted to the side plate 400 on a stud shaft 415 and comprises a U-shaped plate 416 which carries, among other things, a storage roll 417 and a supply roll 418. The supply roll is frictionally held against rotation by any suitable means as by a spring tensioned washer. The plate 416 and its attached parts may be swung around the pivot 415 to an upward position, as shown in full lines in Fig. 5. In this way, access may readily be had for replenishing the paper supply, etc. When in home position the plate is supported on a stud 416" received in a notch 416'. It is held in this position by a latch 416₁, pressed into engagement with the stud 416₂ by a spring 416₃. The storage roll is carried by the shaft 419 rigidly carried by plate 416 and serves as a pivot for the rocking arm 420, shown more clearly in Fig. 5. The upward extension of this arm carries a paper guide roller 424 and the lower extension carries the supply roll 418 on a shaft 421 and also supports a paper guide roller 422.

Guide rollers 423 and 423' are mounted on the plate 416. The paper passes from the supply roll under the roller 422 under the roller 423 around the roller 423', over the tie rod 404 and the shaft 406, under the platen, around the rollers 425 and 425', over a shield 487, to and around the roller 424 and then to the storage roll. The top 101 of the cabinet comprises an aperture over the record strip, which is closed by a transparent plate having a slit therein over the shield 487 which permits of writing on the record strip, as shown in Fig. 3. It will be seen that rocking the arm 420 about its pivot 419 clockwise from the Fig. 3 position will draw the record paper around the platen, bringing the section thereof under the writing opening to a position under the platen; that is, the paper is shifted from writing to printing position. Reverse movement of the arm 420 will restore the paper to writing position, so that the last item printed may be read, and a notation made opposite it if desired.

The printer is operated by a cam 429 on the rotation shaft, engaging the roller 433 on the horizontal arm 431 of a bell crank carried by the main operating shaft 430 extending across the printer frame. The vertically extending arm 432 of this bell crank is provided with a notch 434 in which is received the stud 435 mounted on the rocking arm 420. An extension 436 may be provided for guiding the stud 435 into the notch 434 when the paper frame is returned to normal position, after being rocked to the Fig. 5 position for changing the paper roll, as heretofore explained. The cam is rotated one revolution for each operation of the machine and serves to actuate the bell crank, which, in turn, rocks the rocking arm 420 for performing the functions just described. Near the side plate 401 the shaft 430 carries an arm 437 provided with an upwardly extending portion 438 carrying an ear 439 and a handle 440ₐ. This arm is also provided with a nose 441 and a short stud 442.

The platen is actuated by a hammer 443 pivoted to the side frame 401 by a stud 444. This hammer is provided with a heavy head portion 445 and is forced upward by a spring 447 bearing against the lug 448 and guided by a pin 446. The hammer is provided with a pivot 449 upon which is mounted a hammer retracting pawl 450 having a tail 451 bearing against an adjustable stop 454. This pawl is provided with a bent over ear 452 cooperating with the nose 441 of the arm 437. The pawl is held in position shown by the spring 453. It will be seen that when the arm 437 is rocked, the nose 441 will bear against the ear 452 of the pawl and thereby retract the hammer against the force of the spring 447. Upon a further movement the nose 441 will clear the pawl and permit the hammer to strike the platen tail 411 causing the platen to force the paper against the type. A spring 458 is provided to normally retain the printing platen in lifted position. Extension 459 of the platen frame normally rests on the upper surface of the tie rod 404 to limit the distance the platen may be raised under the influence of spring 458. The arm 411, which is rigidly attached to the platen carrying frame is provided with an arcuate portion 476 which is concentric with the shaft 430, and is also provided with a notch 477 in front of the circular extension. The ear 439 of the arm 437 overlies this circular extension and locks the platen in normal position, so that the pressure exerted in writing on the record strip will not force the platen against the type and cause an incorrect record. When the arm 437 is moved forward the ear 439 clears the circular portion and arrives opposite the notch 477. This unlocks the platen and permits it to be actuated by the hammer.

The storage roll 417 is provided with a ratchet wheel 461. The arm 420 carries an operating pawl 462 held in engagement with the ratchet wheel 461 by means of a spring 462'. Pivoted to the plate 416 as at 459 is a retaining pawl 460. It will be seen that when the arm 420 is rocked forward about the shaft 419 the storage roll will be held stationary by the pawl 460 and the operating pawl will be moved to engage the next tooth on the ratchet, and on the return movement will cause the pawl to rotate the ratchet and the attached storage roll one step forward. It is highly desirable in a machine of this type to have as much as possible of the work done during the down stroke of the keys as there is very little energy available on the up stroke. The paper supply roll is frictionally held against rotation to keep the paper properly tensioned and it will, therefore, require considerable force to unroll the paper between operations for securing the proper line spacing. With the arrangement shown the work of unrolling the paper for feeding is done on the down stroke, the result desired. As described above, the storage roll is stationary on the down stroke of the key and is turned on the up stroke by the pawl 462. While this is true, the work of unrolling a length of paper from the supply roll is done when the storage roll is stationary (down stroke of the key) because the guide roll 424 rocks forward and in so doing permits a short length of paper to be rolled on the storage roll. At the same time, the supply roll 418 as well as the guide roller 422 swing rearward and draw an equivalent length from the supply roll.

In order to permit of the manual feeding of the paper there is provided a feed lever 463 pivoted to the plate 416 at 459 and provided with a hook shaped pawl 464 engaging the ratchet 461. The spring 465 is connected to the pawls 464 and 460 and serves to hold them in engagement with the ratchet. A spring 466 is provided for holding the feed lever normally in forward position.

*Inking ribbon*

The endless inking ribbon 480 passes over the inking spool 481, formed as an inking pad for supplying the ink continuously to the ribbon, between the paper and the type to the other side of the machine where it is looped around a tightening pulley 482 carried by an arm 483, pivotally carried by the frame and tensioned by the spring 484. The upper strand of the ribbon is guided by the guide rollers 485 and 486. The shield 487 is located between the ribbon and the paper and serves as a writing platen when notations are to be made upon the record strip. The spool 481 is actuated step by step by the pawl 488 carried by the bell crank 489 pivotally mounted on the side frame 400. The horizontal portion of the bell crank is bifurcated to provide a slot 490 to receive the stud 491 on the arm 432.

The operation of the printer is as follows: During the down stroke of the keys the cam 429 is rotated 180 degrees whereby the arm 432 is rocked forward causing a similar motion of the rocking arm 420. The paper supply roll 418 and the paper guide roller 422 carried by the arm 420 are moved backward with the result that the paper is drawn around the platen from approximately writing position to printing position, in the present machine a distance of about one and one-quarter inches. The roller 424 is moved forward to provide the necessary length of paper for this purpose. In the meantime, the arm 437, which is carried by the shaft 430, is moved forward to unlock the platen and retract the hammer. Furthermore, the segments have rotated the detail printer wheels to proper position so that when, at practically the end of the down stroke, the hammer actuates the platen, the proper impression will be made on the record strip. During the up stroke of the keys the parts are rocked back to normal position. The roller 424 draws the paper around the platen to writing position. During the return stroke the nose 441 is permitted to clear the ear 452 on account of the resiliency of the spring 453. It will be apparent that the motion of the arm 432 will, through the parts 491, 490, 489 and 488, cause the advance of the inking ribbon step by step at each operation of the machine. The line space feed takes place in the following manner:

During the down stroke of the keys, and while the arm 420 is carrying the roller 424 forward and the supply roll and roller 422 backward, the storage roll 417 is held stationary by pawl 460, wherefore a part of the web of paper is wrapped on said storage roll. The slack yielded by the roller 424 is thus reduced by the amount wrapped on the storage roll and an equivalent amount is simultaneously withdrawn from the supply roll. During the up stroke of the keys, the pawl 462 causes the storage roll to turn backward with the arm 420 and roller 424, so that said roller 424 cannot withdraw from said storage roll the paper that was wrapped thereon during the downstroke of the keys, and instead said paper is retained on the storage roll. As the roller 424 moves backward it shifts the paper from printing position through the extent that said paper moved in its travel to printing position, and further, as the result of the aforesaid turning of the storage roll by pawl 462, there is produced during said backward movement of roller 424 an additional movement of the paper web from printing position. This increment of movement of the paper (say, one quarter inch) corresponds to the amount of paper wrapped on the storage roll during the down stroke of the keys, and constitutes the line space movement of the paper web. As has been noted, during the down stroke of the keys an amount of paper equivalent to that wrapped on the storage roll was withdrawn from the supply roll, and the effecting of the line-spacing increment of movement of the paper need do no more than take up the paper that was unwrapped from the supply roll. Thus the paper feeding parts need withdraw no paper from the supply roll during the up stroke of the keys.

Total printing

The right counter frame 291 is provided on its right side with cam grooves 494 and 495 (shown in Fig. 4) for receiving the guide stud 442 when the totals are to be taken. In order to take the total of the B counter, the handle 440$_B$, rigidly connected to the printer frame, is drawn forward with the result that the printer frame is rocked around the segment shaft until the platen is located opposite the type wheels of the B counter, as shown in Fig. 7. During this rocking forward of the printer frame the stud 433 has been lifted from the cam 429 and the stud 442 has entered the cam groove 495, which is eccentric to the shaft 105, with the result that the arm 437 is rocked forward to the same extent as it had previously been rocked by the cam 429. The cam groove 495 is so proportioned that the platen will be actuated by the hammer when it is opposite the type wheels of the B counter so that the total accumulated thereon is printed on the record strip.

When it is desired to print a total from the A totalizer the handle 440A is drawn forward. Its initial movement rocks the arm 437 and shaft 430 until the abutment 441 engages the ear 452 on the hammer spring pawl. Further movement of the arm 437 relative to the printer frame being resisted by the hammer spring 447, as the handle 440A continues to move downward the printer frame will be rocked about the shaft 105. The initial movement of arm 437, has, however, brought the stud 442 into alignment with the cam groove 494, whereby the printing hammer will be released when the platen is opposite the type wheels of the A counter.

The ends of the grooves 494 and 495 serve to stop the printer in the proper position for taking the totals from the respective counters.

It is to be understood that the drawings and the foregoing description merely represent an illustrative embodiment of inventions capable of assuming many other forms, and adapted for a variety of uses, all falling within the scope of the appended claims.

What is claimed is:

1. In a device of the character described, a type carrier, a pivoted platen adjacent the type carrier, means for actuating the platen at a predetermined time, comprising a spring pressed hammer, an arm for retracting the hammer provided with a shoulder engaging a pawl on the hammer, the engaging surface of said parts having diverging paths of movement, the construction being such that after the hammer is retracted to a certain point by the continuous movement of the surfaces in their diverging paths it is released and permitted to actuate the platen.

2. In a device of the character described, a type carrier, a pivoted platen adjacent the type carrier, means for actuating the platen at a predetermined time, comprising a spring pressed hammer, an arm for retracting the hammer provided with a shoulder engaging a shoulder on a pawl on the hammer, said shoulders having continuous divergent paths of movement and said parts being so positioned and proportioned that after the hammer is retracted to a certain point it is released and permitted to actuate the platen, and means for adjusting the point of release.

3. In a device of the character described, a pivoted platen adjacent the type carrier, means for actuating the platen at a predetermined time, comprising a spring pressed hammer, an arm for retracting the hammer provided with a shoulder engaging a pawl on the hammer, said parts being so positioned and proportioned that after the hammer is retracted to a certain point it is released and permitted to actuate the platen, said retracting arm being provided with a means to lock the platen against actuation when the arm is in home position.

4. In a device of the character described, the combination of a series of keys, a type carrier bearing a series of type characters associated with the various keys, connections between the keys and the type carrier for moving the selected type character to the printing line, means driven by the keys for taking an impression from the type at the printing line, a second type carrying element adjacent to the first mentioned type carrier, said impression means being movable from its position adjacent the first mentioned type carrier to the second type carrying element for taking an impression therefrom, and means for automatically operating said impression means when it reaches a position adjacent said second type carrying element.

5. In a machine of the character described, a shaft, a printing mechanism pivoted thereon, an item type carrier, a plurality of sets of type carrying total wheels, said type carrier and said sets of type carrying total wheels being arranged equi-distantly from said shaft, and said printing mechanism being movable and so arranged that an impression may be taken from said type carrier or from either of said sets of type carrying total wheels.

6. In a device of the character described, a segment shaft, a rotation shaft, an actuator, an item type wheel, a total type wheel, said item type wheel and total type wheel being arranged equi-distantly from said segment shaft and actuatable by the actuator, a printing mechanism normally positioned above the item wheel and oscillatable to a position above the total wheel, said mechanism comprising a printing operating shaft oscillatable by a cam on the rotation shaft for periodically taking an impression from the item wheel, a fixed cam groove, means carried by the operating shaft engageable with said fixed cam groove when the printer is oscillated, whereby the printer is automatically operated for taking an impression from the total wheel.

7. In a machine of the class described, keys, a set of item type wheels, connections between the keys and the item type wheels for bringing the proper type character to the printing line, a plurality of sets of type carrying total wheels, a printing mechanism normally positioned to take an impression from the item type wheels but movable to take an impression from any one of the sets of total wheels, means operated by the machine for periodically taking an impression from the item type wheels and means for automatically operating the printing mechanism for taking an impression from any one of said sets of total wheels when the printer is moved to a position above said set of total wheels.

8. In a machine of the class described, keys, a set of item type carrying elements, connections between the keys and the item type carrying elements for bringing the proper type character to the printing line, a plurality of sets of type carrying total elements, a printing mechanism normally positioned to take an impression from the item type carrying elements and means for automatically operating the printing mechanism for taking an impression from any of said sets of total type carrying elements when the printer is moved to a position above said set of total type carrying elements, said means comprising a supplemental printer operating arm, a plurality of fixed cam grooves for receiving and guiding the operating arm when the printer is moved, whereby the printer is operated when positioned adjacent the selected set of total type carrying elements, and means for guiding the operating arm into the proper cam groove.

9. In a machine comprising depressible keys and type carriers adapted to be moved on depression of said keys, printed mechanism comprising type carriers, a record strip, supply and storage rolls therefor, and means operated by said keys for feeding said record strip step by step from the supply to the storage roll by rolling the strip on the storage roll while said roll is held stationary.

10. In a machine comprising depressible keys and item and total type carriers adapted to be moved by depression of said keys, a platen, a strip of record material, means operated by the keys to actuate said platen to effect printing from the item type carriers, and manipulative means for actuating said platen to effect printing from the total type carriers.

11. In a machine of the class described, the combination of a set of printing elements, strip feeding means, a main operating shaft for normally operating said strip feeding means and said printing mechanism and a printer controlling lever for disconnecting the normal strip feeding means and printing means and placing the latter under control of said printer controlling lever.

12. In a machine of the class described, the combination of a set of type carrying elements, a printing lever associated therewith, printing mechanism, strip feeding means comprising pawl and ratchet means, and a main operating shaft for normally operating said strip feeding means and said printing mechanism, said normal strip feeding and printing means being adapted to be disconnected from said operating shaft and placed under control of said printer controlling lever upon movement of the lever.

13. In a machine of the class described, the combination of a set of type carrying elements, means for taking an impression from said type carrying elements, comprising an oscillatory lever, printing mechanism, strip feeding means, and a main operating shaft for normally operating said strip feeding means and said printing mechanism with provisions whereby upon an operation of said printer controlling lever the normal strip feeding and printing means may be automatically disconnected from said operating shaft and placed under control of said printer controlling lever.

14. In a machine of the class described, the combination of a set of type carrying elements, printing mechanism, strip feeding means, a main operating shaft for normally operating said strip feeding means and said printing mechanism, comprising a cam mounted thereon and a printer controlling lever for disconnecting the normal strip feeding means and operating the printing means.

15. In a machine of the class described, a set of pivotally mounted actuators, a set of item type carriers and a plurality of sets of total type carriers having their printing points at the same radial distances from the axis of the actuators, an impression platen and means for operating the platen to print from the item type carriers or a selected set of total type carriers.

16. In a machine of the class described, a set of pivotally mounted actuators, a set of item type carriers and a plurality of sets of total type carriers operated by said actuators, all of said sets of type carriers having their printing points at the same radial distances from the axis of the actuators, an impression platen having an impression face constructed to take an impression from the type at any one of the printing points, and means for effecting an impression movement of said platen.

17. In a machine of the class described, a plurality of banks of keys, a set of differentially movable actuators, said actuators being closely grouped adjacent to one of the banks of keys, connections for differentially moving the actuators by operation of keys in the corresponding banks, a set of item type carrying elements and a plurality of sets of total type carrying elements operated by the actuators, corresponding elements of said sets being arranged in the same plane, and a platen common to the item type elements and total type elements, and means for operating the platen to print from a selected one of said sets of type carrying elements.

18. In a machine of the class described, a plurality of banks of keys, a set of differentially movable pivoted actuators, said actuators being closely grouped adjacent one of the banks of keys, connections for differentially moving the actuators by movement of keys in the associated banks, a set of item type carriers and a plurality of sets of total type carriers operated by the actuators, a support pivoted on the same axis as the actuators, a platen so connected with said support that it may print from the type carriers, means for operating the platen to print from the item type carriers and additional means for operating the platen to print from the total type carriers.

19. In a machine of the class described, a plurality of banks of keys, a set of differentially movable pivoted actuators, said actuators being closely grouped in a central position in the machine, connections for differentially moving the actuators by movement of different keys in the associated banks, a set of item type carriers and a plurality of sets of printing type carriers operated by the actuators, a platen common to the item type carriers and the sets of total type carriers, and means for operating the platen to print selectively from any one of said sets of type carriers, as desired.

20. In a calculating machine, a shaft, actuators pivoted thereon, means for differentially moving said actuators, item type adjusted proportionally by said actuators, a printing totalizer actuated by said actuators, said item type and totalizer type being located concentrically with respect to said shaft, and a printing device mounted for movement around said shaft, and adapted to take impressions from said item type and said totalizer.

21. In a calculating machine, a set of differentially movable actuators, item type carriers and a printing totalizer operated by engagement with said actuators, a platen normally set to take impressions from the item type carriers and movably to position to print from the totalizer, and means for automatically operating the platen to print upon movement to position for printing from the totalizer.

22. In a calculating machine, a set of pivotally mounted actuators a set of item type carriers and a plurality of printing totalizer elements operated by said actuators, the type carriers and totalizer elements having their printing points at the same radial distances from the axis of the actuators, an impression platen having an impression face constructed to take an impression from the type at any single one of the printing points, and means for effecting printing engagement of the platen impression face with the type at any one of said printing points.

23. In a cash register, a plurality of sets of operating keys, separate means common to each of said sets and adapted to be moved by one of the keys of its set to an extent depending upon the value of the key operated, a plurality of pivoted toothed actuators arranged closely side by side and adjacent the intermediate one of said sets of keys, and means connecting said actuators with respective ones of said common means, printing and totalizer elements arranged in the same planes and operated by each of said actuators, and means for taking impressions from said printing elements and said totalizer elements, said impression taking means being pivoted coaxially with said actuators, whereby said impression taking means is located adjacent said intermediate set of keys.

24. In a cash register three sets of operating value keys, separate devices common to the keys of each of said sets and each adapted to be moved by one of the keys of its set to an extent depending upon the value of the key operated, a plurality of pivoted toothed actuators arranged closely side by side adjacent the center set of keys; connections from said common devices to said actuators, printing and totalizer elements arranged in the same planes and operated by said actuators, and a single impression mechanism for taking impressions from said printing elements and from said totalizer elements, said impression mechanism being arranged adjacent the center set of keys.

25. In a cash registering machine, the combination of a series of amount keys, a type carrier bearing a series of type characters representing the values of the various amount keys, connections between the keys and the type carrier for moving the selected type character to the printing line, means for taking an impression from the type, a totalizer adjacent said type carrier having registering wheels bearing type numbers, said impression means being movable from its position adjacent the type carrier to the totalizer for taking an impression therefrom, and means for automatically operating said impression means when it reaches a position adjacent the totalizer.

26. In a cash register, the combination of a plurality of totalizers, total printing levers corresponding to the totalizers, printing mechanism, strip feeding means, a main operating shaft for normally operating said strip feeding means and said printing mechanism said total printing levers being adapted to disconnect the normal strip feeding means and printing means and place the latter under control of either of said total printing levers.

27. In a cash register, the combination of a totalizer, a total printing lever, printing mechanism, strip feeding means, a key operated operating shaft for normally operating said strip feeding means and said printing mechanism said total printing lever being adapted to disconnect the normal strip feeding and printing means and place the latter under control of said total printing lever.

28. In a cash register, the combination of a totalizer, printing mechanism, strip feeding means, a main operating shaft for normally operating said strip feeding means and said printing mechanism, comprising a cam mounted thereon, and a total printing lever for disconnecting the normal strip feeding means and operating the printing means.

29. In a machine of the class described, a total printing wheel and an item printing wheel arranged substantially in the same vertical plane, a common actuating rack segment for rotating said wheels, a printing unit common to said wheels, said unit comprising storage and supply rolls adapted to support a record strip and guide means for guiding said strip into printing relation with both of said wheels, means for causing an impression to be taken from said item wheel upon said strip during item entering operations, and means for causing an impression to be taken upon said strip from said total printing wheel, said last mentioned means serving to disable said means causing an impression to be taken from said item wheel.

30. In a key operated cash register, a plurality of operating keys, item printing elements controlled thereby, and autographic printing mechanism cooperating therewith comprising a supply roll, a storage roll, guide means for supporting a record strip passing from said supply roll to said storage roll, supporting means carrying a pair of guide rollers and mounted on the axis of said storage roll, means for rocking said supporting means and thereby shifting said record strip to carry a portion thereof from a point adjacent a writing opening to a point above said printing elements, means for taking an impression from said elements upon said strip, means for rocking said supporting means to its normal position to shift said strip in the opposite direction and means associated with said supporting means acting during the shifting of said strip to cause a greater shift in one direction than the other.

31. In a key operated cash register having a plurality of operating keys, the combination of a set of item printing wheels controlled thereby, a set of total type wheels adjacent said set of item type wheels, autographic printing mechanism cooperating with said type wheels, record strip supporting and feeding devices comprising a supply roll, a storage roll, means for guiding a strip of record material from said supply roll to said storage roll, means for shifting said record material from writing position to position for receiving an impression from said item type wheels and means for shifting said record material from writing position to position to receive an impression from said totalizer wheels.

32. In a key operated cash register having a plurality of key operated actuators, the combination of a set of item printing wheels, and a set of totalizer wheels actuated thereby, an autographic printing mechanism cooperating with said sets of printing wheels, record strip supporting and feeding devices, comprising a supply roll, a storage roll, means for guiding a strip of record material from said supply roll to said storage roll, means comprising arms pivoted concentric with said storage roll for shifting said record material from writing position to position for receiving an impression from said item wheels, and means for shifting said record material from writing position to position to receive an impression from said totalizer wheels.

33. In a machine of the class described, the combination of a series of keys, item type controlled thereby, an impression member, means whereby said keys cause actuation of said impression member to effect printing on a record strip of items from said type, total type spaced from said item type and settable by operation of said keys, and means for shifting said impression member into operative relation with said total type and causing said impression member to print on said record strip a total of said items.

34. In a machine of the class described, an impression member, a supply roll, a storage roll, a printer frame carrying said member and said rolls, means carried by said frame whereby said impression member may be actuated and whereby said rolls may be operated to produce line-spacing of record material, a plurality of sets of type elements normally out of operative relation with respect to said impression member, and means for shifting said frame to bring said impression member into operative relation with any one of said sets of type elements.

35. In a machine of the class described, a series of depressible keys, a set of item type carriers positionable by said keys, a set of total type carriers positionable by said keys, a single means for taking impressions on a record material from either of said sets of type carriers, and means whereby said impression means may be operated by said keys for taking impressions from one of said sets.

36. In a machine of the class described, a printer frame, a percussive impression member carried thereby and movable with respect thereto for effecting printing, means for shifting said frame, and means for causing percussive operation of said impression member as an incident to the shifting of said frame.

37. In a machine of the class described, a shiftable printer frame, a percussive impression member carried thereby and movable with respect thereto for effecting printing, paper feeding means carried by said frame, and a movable member operable as an incident to shifting of said frame for causing operation of said impression member and said paper feeding means.

38. In a machine of the class described, a set of differentially movable actuators, a set of item type carriers and a set of total type carriers operated by said actuators, a platen normally set to take impressions from one of said sets of type carriers and shiftable to position for taking impressions from another of said sets, and means for automatically operating said platen.

39. In a machine comprising depressible keys and type carriers adapted to be moved by depression of said keys, printing mechanism adapted to take impressions from said type carriers, comprising a printer frame, a paper frame carried thereby, a supply roll, and two guide rollers supported on the paper frame, a platen, record material leading from the supply roll, over a guide roller, around the platen, and over the second guide roller, and means for moving the guide rollers with respect to said paper frame to periodically shift the paper around the platen from a visible to a printing position.

40. In a machine of the class described, the combination of a plurality of sets of printing elements, printer controlling levers associated with each of said sets of printing elements, printing mechanism, strip feeding means, and a main operating shaft for normally operating said strip feeding means and said printing mechanism, the construction and arrangement being such that the normal strip feeding means may be disconnected from said operating shaft and thereafter controlled by one of said levers.

41. In a machine of the class described, the combination of a set of printing elements, a printer controlling lever associated therewith, printing mechanism, a strip feeding means, and a key operated shaft for normally operating said strip feeding means and said printing mechanism, with provisions whereby the normal strip feeding and printing means may be disconnected from the operating shaft and conditioned for actuation by said printer controlling lever.

42. In a machine of the class described, a set of differentially movable actuators, item type carriers, and a plurality of sets of total type carriers operated by said actuators, a platen normally in printing relation with the item type carriers and movable to printing relation with any one of said sets of total type carriers, separate means for effecting said movements, and means controlled by said last mentioned means for operating the platen to print.

43. In a machine of the class described, a shaft, a printing mechanism pivoted thereon, a plurality of sets of type carrying wheels arranged equi-distantly from said shaft, said printing mechanism being movable and so arranged that an impression may be taken from any one of said sets of type carrying wheels.

44. In a machine of the class described, a type carrier, a printing mechanism adapted to take impressions from said type carrier comprising a printer frame, a shaft supporting said frame, a paper frame supported by said printer frame, a supply roll and a storage roll supported on the paper frame one end of each of said rolls being attached to the paper frame and the other end of each roll being unsupported, said paper frame being movable with respect to said printer frame so as to move the free end of said rolls away from its normal position to give access thereto for removing and replacing the record material.

45. In a machine of the class described, comprising reciprocable operating keys and a type carrier adapted to be positioned thereby, means for taking an impression therefrom comprising a printing platen, a writing platen, supply and storage rolls, a record strip passing from the supply roll over the platens and to the storage rolls, means for moving the record strip relative to the platens from substantially writing position to printing position and for drawing paper from the supply roll during the first stroke of said keys, means for taking an impression thereon and then moving the strip a greater distance to writing position.

46. In a machine of the class described, having an enclosing casing formed with a sight opening, a plurality of reciprocable operating keys, a type carrier adapted to be moved by the depression of one of said keys, a platen positioned above the type carrier and in line with the sight opening, supply, storage and guide rolls, a record strip passing from the supply roll over a guide roll between the type and the platen, thence over the platen, over a second guide roll and to the storage roll, means operated during the first stroke of the keys for moving the guide rolls so as to move the strip relative to the platen from visible to printing position and for drawing paper from the supply roll, means for taking an impression thereon, and means for returning the guide rolls to their original position whereby the impression bearing part of the strip is moved to visible position, all of said means being actuated by operation of said keys.

47. In a machine of the class described, having an enclosing casing formed with a sight opening, a plurality of reciprocable operating keys, a type carrier adapted to be moved by the depression of one of said keys, a platen positioned above the type carrier and in line with the sight opening, supply, storage and guide rolls, a record strip passing from the supply roll over a guide roll between the type and the platen, thence over the platen, over a second guide roll and to the storage roll, means operated during the first stroke of the keys for moving the guide rolls so as to move the strip relative to the platen from visible to printing position and for drawing paper from the supply roll, means for taking an impression thereon, means for returning the guide rolls to their original position whereby the impression bearing part of the strip is moved to visible position, and means for imparting a feed motion to the paper during each operation, all of said means being actuated by operation of said keys.

In witness whereof I have signed my name hereto this 27th day of November, 1926.

FREDERICK L. FULLER.